(12) United States Patent
Pearce

(10) Patent No.: US 8,782,934 B2
(45) Date of Patent: Jul. 22, 2014

(54) APPARATUS FOR HOUSING ARTIFICIAL FEATURES AND IMPROVED INTERNAL MAGNETS FOR USE IN ARTIFICIAL FEATURES

(75) Inventor: Terry V. Pearce, Alpine, UT (US)

(73) Assignee: Edizone, LLC, Alpine, UT (US)

( * ) Notice: Subject to any disclaimer, the term of this patent is extended or adjusted under 35 U.S.C. 154(b) by 0 days.

(21) Appl. No.: 13/105,600

(22) Filed: May 11, 2011

(65) Prior Publication Data
US 2012/0285057 A1 Nov. 15, 2012

(51) Int. Cl.
G09F 19/00 (2006.01)
A01K 63/00 (2006.01)
A47F 3/00 (2006.01)

(52) U.S. Cl.
CPC ............ *A01K 63/003* (2013.01); *A47F 3/00* (2013.01); *G09F 19/00* (2013.01)
USPC .............................. 40/406; 40/426

(58) Field of Classification Search
USPC .................................. 40/406, 426
See application file for complete search history.

(56) References Cited

U.S. PATENT DOCUMENTS

| | | | | | |
|---|---|---|---|---|---|
| 4,578,044 | A | * | 3/1986 | Saitoh | 446/134 |
| 4,691,459 | A | | 9/1987 | Butler | |
| 4,723,233 | A | * | 2/1988 | Beebe | 368/76 |
| 5,301,444 | A | | 4/1994 | Horiuchi | |
| 5,463,826 | A | | 11/1995 | Horiuchi | |
| 5,575,554 | A | * | 11/1996 | Guritz | 362/103 |
| 5,603,994 | A | * | 2/1997 | Su | 428/11 |
| 5,666,750 | A | * | 9/1997 | Segan et al. | 40/410 |
| 5,685,096 | A | | 11/1997 | Horiuchi | |
| 5,941,106 | A | * | 8/1999 | Williamson et al. | 70/278.1 |
| 5,994,450 | A | | 11/1999 | Pearce | |
| 6,131,318 | A | * | 10/2000 | Hsieh | 40/406 |
| 6,148,770 | A | | 11/2000 | Lin | |
| 6,349,492 | B1 | * | 2/2002 | Lee | 40/426 |
| 6,564,484 | B1 | * | 5/2003 | Ikenaga et al. | 40/426 |
| 6,665,964 | B2 | | 12/2003 | Klotz | |
| 6,797,765 | B2 | | 9/2004 | Pearce | |
| 6,814,646 | B2 | * | 11/2004 | Atobe et al. | 446/267 |
| 7,243,613 | B2 | | 7/2007 | Holms et al. | |
| 7,247,076 | B2 | * | 7/2007 | Dang et al. | 446/102 |

(Continued)

OTHER PUBLICATIONS

Wikipedia: Programmable Logic Controller URL: http://en.wikipedia.org/wiki/Programmable_logic_controller Revision date May 10, 2012.*

(Continued)

*Primary Examiner* — Joanne Silbermann
*Assistant Examiner* — Christopher e Veraa
(74) *Attorney, Agent, or Firm* — TraskBritt

(57) ABSTRACT

Disclosed is an enclosure for artificial features such as artificial fish and artificial plants. The enclosure has one or more walls and is configured to house a liquid therein. One or more electromagnets are provided to generate a magnetic field within the enclosure. A controller is configured to control electric currents that generate magnetic fields from the one or more electromagnets. The controller is configured to selectively reverse the magnetic polarity of at least one of the one or more electromagnets. Also disclosed is an artificial feature such as an artificial fish or artificial plant with a body made of elastomeric gel. The artificial feature may include multiple permanent magnets housed in a body where the permanent magnets are aligned based on an orientation of a north pole and a south pole of each permanent magnet.

23 Claims, 7 Drawing Sheets

(56) References Cited

U.S. PATENT DOCUMENTS

| | | | |
|---|---|---|---|
| 7,312,773 B1 * | 12/2007 | Herzen et al. | 345/82 |
| 7,617,624 B1 * | 11/2009 | Chen | 40/406 |
| 2006/0119416 A1 * | 6/2006 | Fung et al. | 327/530 |
| 2006/0194925 A1 | 8/2006 | Pearce | |
| 2007/0251866 A1 * | 11/2007 | Wong | 210/167.21 |
| 2008/0104869 A1 * | 5/2008 | Wang | 40/406 |
| 2010/0167620 A1 * | 7/2010 | Jackson et al. | 446/135 |

OTHER PUBLICATIONS

Tony Pearce, U.S. Appl. No. 12/080,088, filed Mar. 31, 2008.

* cited by examiner

APPARATUS FOR HOUSING ARTIFICIAL FEATURES AND IMPROVED INTERNAL MAGNETS FOR USE IN ARTIFICIAL FEATURES

TECHNICAL FIELD

Embodiments of the present disclosure relate to artificial life-like creatures and other features, enclosures for artificial creatures, and magnets used to enable movement of such artificial creatures. More specifically, certain embodiments of the present disclosure relate to realistically simulating life-like movements of creatures and other artificial features in an enclosure.

BACKGROUND

Conventional liquid enclosures for housing artificial fish are available in the marketplace. One of the purposes of these products is to provide amusement and relaxation for the observer without having to maintain live creatures or plants. Living creatures and plants inherently foul the liquid of liquid enclosures, have an inherent need to be fed or fertilized, and have an inherent difficulty in being kept alive. Furthermore, living creatures may have a tendency to outgrow a liquid enclosure depending on its size.

U.S. Pat. No. 6,665,964 to Klotz (hereinafter "Klotz") describes the use of electromagnets, optical sensors, and liquid flow to enable movement of an artificial fish within a liquid enclosure. In Klotz, liquid pumps act to move artificial fish around a tank of liquid. As the fish move within the enclosure, an optical sensor senses when a fish swims by, and when the sensor senses the nearness of the fish to an electromagnet, the electromagnet is turned on. Depending on the orientation, this will either repulse or attract the fish, causing a sudden movement of the fish.

However, the embodiments described in Klotz do not result in realistic movement of the fish. For example, live fish almost always have some erratic motion, rarely repeat the same motion many times, and rarely swim in a straight line. Conventional artificial fish tanks such as that described in Klotz fail to accurately simulate the erratic motion of live fish. Some conventional embodiments use mechanically rotating permanent magnets as control magnets to pulse and reverse a magnetic field generated in the tank. This provides motion of the fish, but does not provide sufficiently complex control that is needed for more life-like motion of the fish. A static magnetic field or a pulsed but non-reversing magnetic field, such as that described in Klotz, is less able to simulate erratic motions, reversing directions, and turning actions. Further, conventional designs do not utilize a reversing-field electromagnet or precise magnetic field control, and thus the fish movements are not sufficiently realistic.

BRIEF SUMMARY

The present disclosure provides an apparatus for housing artificial fish that, in one embodiment, includes an enclosure having one or more walls and configured to house a liquid therein. The apparatus also includes one or more electromagnets configured to generate a magnetic field within the enclosure and a controller configured to switch one or more electric currents that cause the generation of the magnetic field by the one or more electromagnets. The controller may be configured to selectively reverse the polarity of and control the magnetic field strength of at least one of the one or more electromagnets.

An embodiment of an artificial feature is provided that includes a body comprising elastomeric gel. The artificial feature may further include a motion device, such as a magnet, housed in the body that is responsive to a magnetic field.

Another embodiment of an artificial feature is provided with a plurality of permanent magnets housed in the body. Each of the plurality of permanent magnets has a north pole and a south pole and each of the plurality of permanent magnets is aligned within the body based on a relative orientation of the north pole and the south pole of each respective permanent magnet.

BRIEF DESCRIPTION OF THE DRAWINGS

While the specification concludes with claims particularly pointing out and distinctly claiming what are regarded as embodiments of the present disclosure, the advantages of the embodiments of the disclosure may be more readily ascertained from the description of embodiments of the disclosure when read in conjunction with the accompanying drawings, in which:

DETAILED DESCRIPTION

Figure 1:
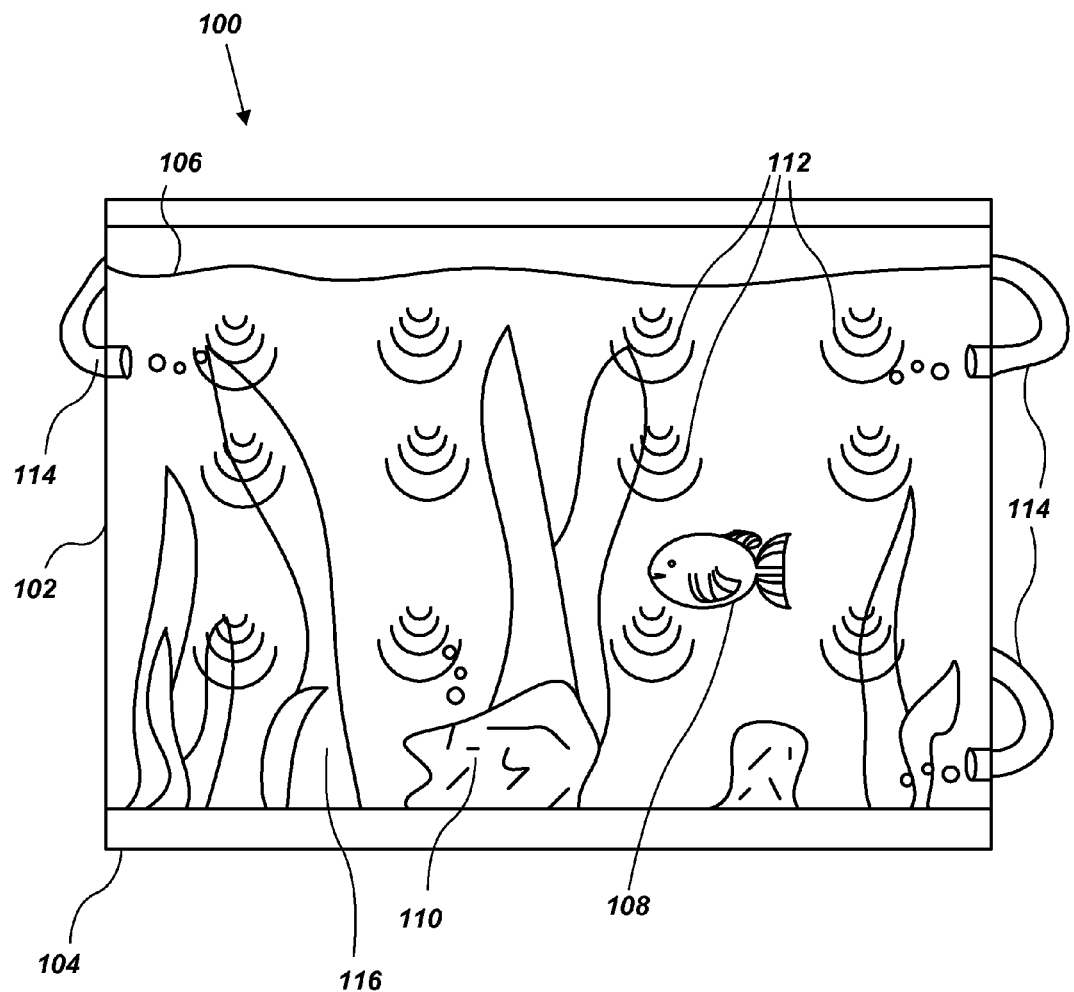
FIG. 1 is a simplified front view of one embodiment of an apparatus for housing artificial features in accordance with the present disclosure.

The embodiments described herein utilize methods of creating movement, and controlling and/or intentionally randomizing movement of artificial features, such as artificial fish and other artificial features, that result in improved function, i.e., they look more alive and/or natural in their movements than do prior art products. In this disclosure, "control magnet" refers to a magnet, either a permanent magnet or electromagnet or a plurality of magnets, that provides one or more magnetic fields to move magnetically responsive artificial features, and "feature magnet" refers to a permanent magnet installed in an artificial feature upon which the control magnet(s) act upon to move an artificial feature, such as but not limited to artificial fish.

In this disclosure, the phrase "artificial feature" or "artificial aquatic feature" refers to objects such as artificial fish, artificial plants, artificial rocks, artificial creatures, and other objects that may be realistically simulated in accordance with the present disclosure. Some embodiments may refer specifically to an artificial fish, artificial plants, or other objects, but it is contemplated that any artificial feature such as a fantasy character, toy, building, or other thing may be similarly implemented using the embodiments described herein.

In this disclosure, "controller" refers to a control apparatus comprising a microcontroller or other logic device and switching devices. In this disclosure, "switching device" refers to any type of mechanical or solid state switch including, but not limited to, transistors, TRIACs ("Triodes for Alternating Current"), relays, and H-bridges and other circuits typically used to control direct current motors.

In this disclosure, "live fish" or "living fish" means living creatures or living plants generally used herein to compare features of their movements to similarly appearing artificial features such as artificial fish or artificial plants. In this disclosure, "enclosure" means a partial or full enclosure configured to hold a substantially transparent liquid such as, but not limited to, water, alcohol, or mineral oil, and intended for allowing the viewing of artificial features either moving or stationary in the transparent liquid. The view may be through one or more walls 102 of an enclosure 104 or from above it through the liquid's surface. For example, an enclosure 104 may be an aquarium, fish bowl, or rigid pond liner. In some embodiments, an enclosure may also be referred to herein as a "water enclosure" or "liquid enclosure."

The subject matter herein described falls into separate groups, each of which will be under one of the following headings: (1) Enclosure with Artificial Features Having Life-like Movement, (2) Magnetized Artificial Features Made from Elastomeric Gel, and (3) Improved Internal Magnets for Use in Artificial Features. The subject matter described herein relates to an enclosure filled or partially filled with a liquid having artificial features move about in a life-like manner. The movement of the artificial features is enabled by having permanent magnets in the artificial feature, and separate electromagnets outside and/or inside the enclosure that generate magnetic fields inside the liquid enclosure for controlling movement of the artificial features. Movement of the artificial features may occur with or without a liquid current generated by a liquid pump, air pump, or other device.

In the following detailed description, reference is made to the accompanying drawings, which form a part hereof, and in which is shown, by way of illustration, specific embodiments in which the present disclosure may be practiced. These embodiments are described in sufficient detail to enable a person of ordinary skill in the art to practice the present disclosure. However, other embodiments may be utilized, and structural, logical, and electrical changes may be made without departing from the scope of the disclosure. The illustrations presented herein are not meant to be actual views of any particular system, device, structure, or circuit, but are merely idealized representations that are employed to describe the embodiments of the present disclosure. The drawings presented herein are not necessarily drawn to scale. Additionally, elements common between drawings may retain the same numerical designation.

While the present disclosure is susceptible to various modifications and alternative forms, specific embodiments have been shown by way of example in the drawings and have been described in detail herein. However, the present disclosure is not intended to be limited to the particular forms disclosed. Rather, the present disclosure is to cover all modifications, combinations, equivalents, and alternatives falling within the scope of the present disclosure as defined by the following appended claims and their legal equivalents.

Enclosure with Artificial Features Having Life-Like Movement

One of the problems in dealing with making artificial features move, such as making artificial fish swim in a life-like manner, is that conventional control magnets may not reverse magnetic polarity. Thus, the artificial fish will either go to and stay at the electromagnet or will always be repelled, because a permanent feature magnet, such as may be situated within an artificial fish, typically has an unchanging magnetic polarity. For example, a feature magnet in an artificial fish is typically situated (but not necessarily) with one pole toward the front of the fish.

FIG. 1 is a simplified front view of one embodiment of an apparatus 100 for housing artificial fish in accordance with the present disclosure that enables the reversing of magnetic poles of a control magnet. The apparatus 100 includes one or more walls 102 that form an enclosure 104 for housing a liquid 106 therein. As depicted, the one or more walls 102 are configured in a rectangular shape and the enclosure 104 is formed in a substantially cubic shape. However, other shapes and configurations are contemplated herein, including but not limited to, circular, triangular, spherical, pyramidal, and cylindrical. The walls 102 may be formed of materials such as glass, acrylic, polycarbonate, other plastics, metal, composite materials such as fiberglass, or other materials known in the art. In various embodiments, at least one wall 102 is substantially transparent to enable viewing into the enclosure 104. One or more walls 102 may be rounded or curved to further enhance the viewing of items in the enclosure 104.

Figure 2:
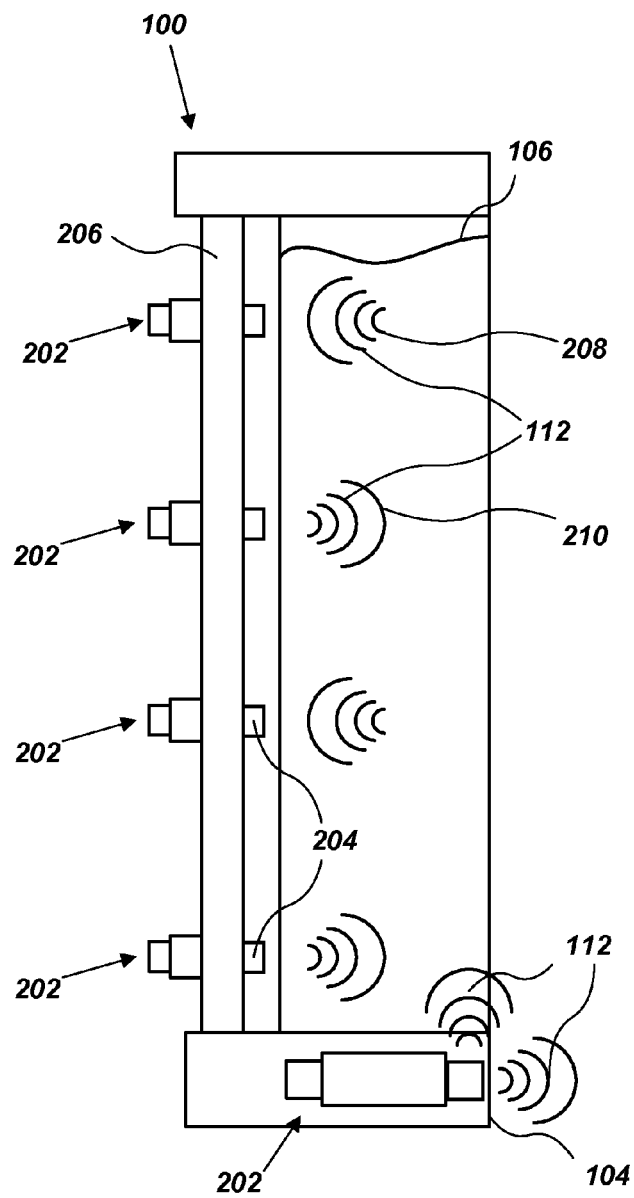
FIG. 2 is a simplified side view of one embodiment of an apparatus for housing artificial features in accordance with the present disclosure.
Figure 3:
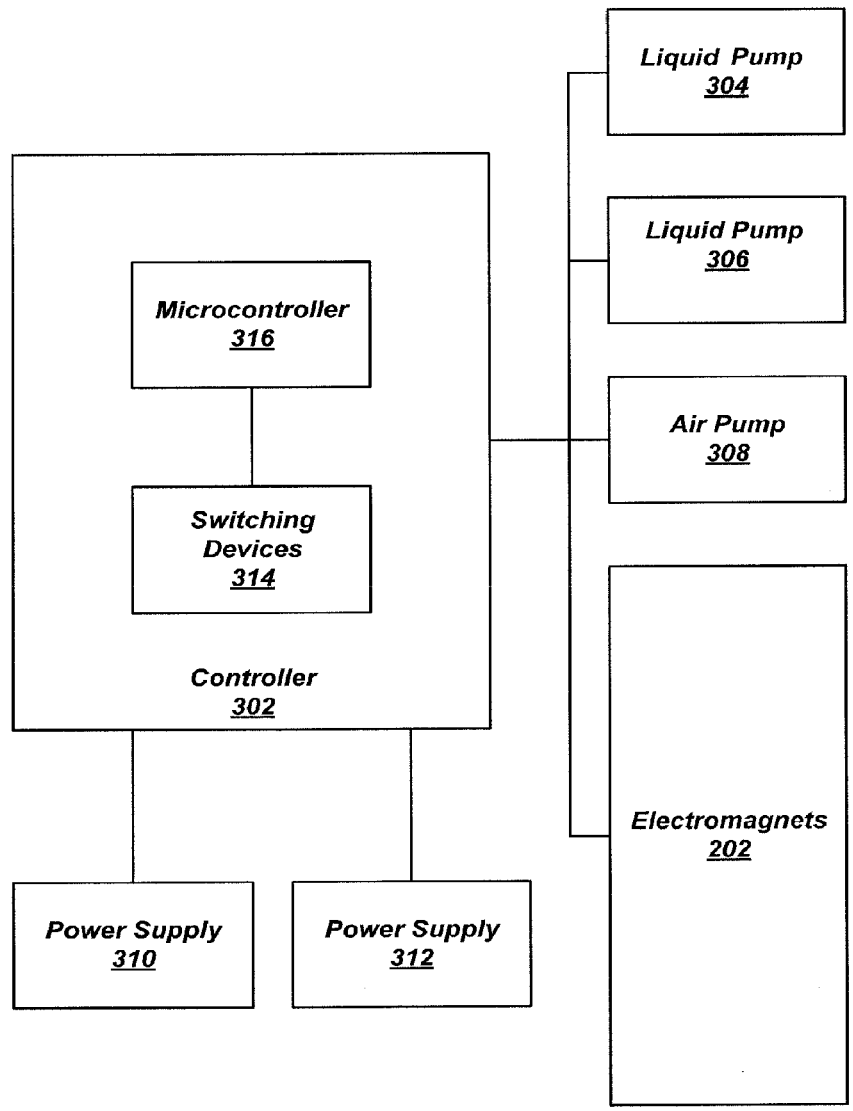
FIG. 3 is a schematic block diagram of one embodiment of a controller of an apparatus for housing artificial features in accordance with the present disclosure.

In one embodiment, artificial features 108, 110, 116 may be situated in the enclosure 104. The artificial features 108, 110, 116 may include artificial creatures such as artificial fish 108 and may also include other artificial features such as artificial plants 110, artificial rocks or artificial coral 116. The artificial features 108, 110, 116 may be configured with internal (or external) feature magnets that react to magnetic fields 112 generated within the enclosure 104. The magnetic fields 112 facilitate movement of the artificial features 108, 110, 116 as described in more detail below. The magnetic fields 112 may be generated by control magnets such as electromagnets 202 (FIG. 2). The electromagnets 202 may be controlled by a controller 302 (FIG. 3). In one embodiment, the electromagnets 202 are operable to generate a magnetic field 112 in a first direction and to generate a reversing magnetic field 112 in an opposite direction. Thus, the electromagnets 202 may be operated to alternately repel and attract an artificial feature 108, 110, 116 housed in the enclosure 104.

A reversing magnetic field 112 can simulate well the erratic and life-like motions of an artificial feature 108, 110, 116, such as erratic motions, reversing directions, and turning actions. Conventional tanks for artificial fish lack reversing-field electromagnets, such as the reversing-field electromagnets 202 (FIG. 2), and thus the artificial fish in such designs are not as realistic in their motions.

In particular, one advantage of a reversing electromagnetic field is that the electromagnet 202 (FIG. 2) can be controlled to draw an artificial feature 108, 110, 116 to the electromagnet 202 if the magnetic polarity is set to attract the artificial feature 108, 110, 116 and then cause the artificial feature 108, 110, 116 to reverse direction and turn away by quickly reversing the magnetic polarity of the electromagnet 202. For example, a reversing and turning algorithm provides an artificial fish 108 with a life-like motion that, by way of non-limiting example, looks like the artificial fish 108 are "feeding on" or "exploring" the surface of the liquid 106 of the enclosure 104. Many other life-like movements also result with regard to artificial fish 108 and other objects such as artificial plants 116, and artificial coral 110. Without this effect, i.e., without reversing magnetic polarity, when an electromagnet 202 switches on with the same magnetic polarity each time the electromagnet 202 is energized, an artificial feature 108, 110, 116 may be drawn to the electromagnet 202 repeatedly and without ever reversing and turning away. The reversing and turning away results from reversing the electromagnets 202 in accordance with the present disclosure.

Further, when using conventional non-reversing magnetic-polarity electromagnets, an artificial fish, by virtue of a permanent magnet within the artificial fish, may be sufficiently attracted to the ferrous core of the electromagnet and thus may attract the artificial fish to the electromagnet even when the electromagnet is turned off, thereby providing no life-like motion even though the electromagnet may be pulsing. If the electromagnet is only pulsed on and off with the same magnetic polarity, and the magnetic polarity thereby repels the artificial fish, there is little or no life-like action such as, by way of non-limiting example, simulating a living fish eating from the sides of a liquid enclosure or from objects in the liquid enclosure. The present disclosure includes embodiments wherein one or more reversing-polarity electromagnets 202 (FIG. 2) make an artificial feature's 108, 110, and 116 movements more like those of actual features such as living fish or living plants.

The apparatus 100 may also include one or more tubes 114 that are connected to a liquid pump 304, 306 or to an air pump 308 (FIG. 3). The tubes 114 may facilitate the movement of liquid and/or air into the enclosure 104 to further enhance the life-like movement of the artificial features 108, 110, 116. For example, pumping liquid 106 through the enclosure 104 may cause an artificial fish 108 to drift slowly through the liquid 106, whereas the electromagnets 202 (FIG. 2) may be operated to simulate additional life-like movements such as fleeing or feeding. In some embodiments, the tubes 114 may be eliminated from the apparatus 100.

FIG. 2 is a simplified side view of one embodiment of the apparatus 100 for housing artificial features 108, 110, 116 (FIG. 1) in accordance with the present disclosure. FIG. 2 depicts a plurality of electromagnets 202, each having a core 204, and arranged in an array. The array of electromagnets 202 is situated in a support wall 206 that enables the electromagnets 202 to be spaced and positioned in an array to generate magnetic fields 112 in the enclosure 104. As depicted, the electromagnets 202 are configured to generate a magnetic field 112 of a first polarity 208 and of a second polarity 210. Each electromagnet 202 may be independently controlled to change from one polarity to another, to change the strength of the electromagnets 202 in either polarity (e.g., by using of pulse width modulation), and to turn off or turn on each electromagnets 202. Turning off and changing polarity to reverse the direction of the magnetic field 112 generated by the electromagnet 202 and enables the artificial features 108, 110, 116 to move in an increasingly life-like manner. In some embodiments, the enclosure 104 may include a side wall and/or back wall or compartment for hiding the electromagnets 202 and other components from view.

Reversing the magnetic polarity of an electromagnet 202 typically requires reversing the electrical direction of the supply current of the electromagnet 202. Conventional artificial fish in liquid enclosures may use electromagnets; however, they do not include an element of control for reversing current direction in electromagnets for control of the artificial fish. FIG. 3 is a schematic block diagram of one embodiment of a controller 302 of an apparatus 100 for housing artificial features 108, 110, 116 (FIG. 1) in accordance with the present disclosure. The controller 302 may be electrically coupled to a plurality of controllable devices including the electromagnets 202, one or more liquid pumps 304, 306, and one or more air pumps 308 (only one air pump 308 is shown in the embodiment of FIG. 3; however, additional air pumps may be used in further embodiments). The controller 302 may be configured to generate one or more electric signals that control the generation of and the polarity of the magnetic fields 112 (FIGS. 1 and 2) of the electromagnets 202. The controller 302 is configured to selectively reverse the polarity of at least one of the electromagnets 202 to facilitate a change in direction of a corresponding magnetic field 112.

In one embodiment, the controller 302 comprises a microcontroller 316 and one or more switching devices 314 that may be coupled to one or more power supplies 310, 312 and may use power from the power supplies 310, 312 to operate the electromagnets 202, one or more liquid pumps 304, 306, and one or more air pumps 308. Specifically, the microcontroller 316 may be configured to provide control signals to the switching devices 314, which will then send an electric current to the electromagnets 202 to selectively generate a magnetic field 112 of a particular polarity and strength. The direction of a magnetic field 112 may be changed by reversing the polarity of a corresponding electromagnet 202. Switching the polarity of a magnetic field 112 may be accomplished by switching the direction of an electric current to an electromagnet 202 via the switching devices 314, which, are in turn, controlled by the microcontroller 316. Other types of controls as recognized by one of skill in the art may also be used herein.

By way of non-limiting example, a type of controller 302 with the ability to change the polarity of an electromagnet 202 may include an H-bridge switching device. One type of H-bridge is a Toshiba TA8429HQ. Many different H-bridges are available in the industry and the H-bridge is well understood in the art of electronic control. H-bridges allow logic level output from, by way of non-limiting example, a programmable logic controller ("PLC") or a microcontroller 316 to control a supply voltage to create on-reverse states, on-forward states, and "off" states needed to control the magnetic polarity of an electromagnet 202 or to turn it off. This may be done without requiring the use of separate positive and negative voltage supplies. Separate positive and negative supply voltages would increase the cost of production, but may still be used in accordance with the present disclosure. H-bridges can be built from discrete components, and there are other traditional methods for reversing DC motor direction and other electronic configurations, which one may substitute for H-bridges to achieve a reversing electromagnet 202.

In another embodiment, two or more multiple-pole relays or other electromechanical switching devices 314 may be used as part of the controller 302. In such an embodiment, a microcontroller 316 may operate the relays or switching devices 314 to turn off the electromagnets 202 as part of the electromagnet control. H-bridges and similar or alternative devices enable the turning off of electromagnets 202. Using the power off-state is an option of the programmer and could be implemented, or not implemented, to achieve certain behaviors in artificial features 108, 110, 116, but the use of the "off" state is generally advantageous as a tool in combination with the states of positive and negative magnetism. A true "off" state is not typically possible with permanent control magnets such as, by way of non-limiting example, rotating external magnets.

In order to have an H-bridge, or similar device, change the magnetic polarity of an electromagnet 202 by reversing the electric current, the H-bridge may receive a control signal from some sort of control device or microcontroller 316. In some instances, the H-bridge control may be integrated with a system controller 302 or subsystem controller. In one embodiment, a microcontroller 316 is implemented such as, by way of non-limiting example, an ATMEL® Amega 1280 microcontroller for the purpose of controlling the H-bridge device. Many other suitable microcontrollers 316 or substitutes are readily available.

Microcontrollers 316, also known as microprocessors, are quite different than a PLC, as described in the aforementioned Klotz patent. Such differences between a PLC and a microcontroller 316 are well known. By way of non-limiting example, a PLC (such as in Klotz) is a control device that is separate from what it controls and requires a separate module or modules to provide reversing control of electromagnets 202. In some embodiments of the present disclosure, a microcontroller 316 (as opposed to a PLC) is generally embedded into the same electrical circuit boards placed within the system it controls and therefore is frequently called an "embedded controller." Thus, a microcontroller 316 may be embedded into the circuit board(s) that control and power any or all of the electromagnets 202, the air pump 308, the liquid pumps 304, 306, the lights, and the other features of the apparatus 100, and which circuit boards may be housed within the apparatus 100.

In one embodiment, many electromagnets 202 and power supplies 310, 312 may be used. A designer may choose to provide two power supplies 310, 312 and, by way of non-limiting example only, the power supplies 310, 312 may be configured to respectively provide voltages of +24 V DC and −24 V DC. Two power supplies 310, 312 or a single multi-voltage power supply may be more costly than one single voltage power supply 310, but an offsetting savings may result from elimination of the H-bridge for which transistors or other switching devices 314 may be substituted. The switching devices 314 may be controlled, by way of non-limiting example only, by an embedded microcontroller 316 to provide on-reverse states (using one power supply), on-forward states (using the other power supply), and off-states (no power), as desired by the programmer.

In one embodiment, pulse width modulation (PWM) may be used to adjust the effect of an electromagnet 202 on the artificial features 108, 110, 116 (FIG. 1). The PWM may be accomplished by pulsing a supply voltage to an electromagnet 202, so that effectively the electromagnet 202 reacts as if a lower voltage were applied. In one embodiment, a pulse duration and pulse spacing may be in the millisecond range. PWM can reduce the current through an electromagnet 202, and thereby reduce the force of the magnetic field 112 produced. This means that if less jerkiness (rapid movement due to a strong magnetic field 112) of, for example, an artificial fish 108 is desired, then the programmer can use PWM to reduce the force of the magnetic field 112 and thereby reduce the speed of a response. The programmer can also vary the level of PWM over time so that, by way of non-limiting example, an artificial feature 108, 110, 116 can be moved from a farther distance toward an electromagnet 202 by having the electromagnet 202 fully on. However, because the magnetic force is programmed to reduce over time, the artificial feature 108, 110, 116 will not accelerate at the same rate toward the electromagnet 202 as it would if the electromagnet 202 remained fully on. The same, by way of non-limiting example, applies if the electromagnet 202 is pushing the artificial feature 108, 110, 116 away and low acceleration of the artificial feature 108, 110, 116 is desired by the programmer. The PWM may start at a low level and increase to a high level over time, giving the artificial fish 108 a chance to slowly gain distance from the electromagnet 202, but still be pushed away to a farther distance as the PWM gradually turns the electromagnet 202 fully on. These functions of PWM enable the magnetic force on a feature magnet installed in an artificial feature 108, 110, 116 to vary with the distance from the electromagnet 202 due to the shape and other characteristics of magnetic fields 112.

In some embodiments, reversing electromagnets 202 may be placed inside or outside the enclosure 104, or a combination of both. Placing them outside the enclosure 104, as depicted in FIG. 2, simplifies the manufacturing, leaves more of the interior space open for movement of the artificial features 108, 110, 116, costs less than providing sealed interior enclosures to keep the liquid 106 away from the electromagnet(s) 202, and eliminates the possibility of leakage that is introduced. For example, a floor or the walls 102 of the enclosure 104 may be penetrated by enclosed electric wires, core, and coil in order to operate electromagnets 202 inside the enclosure 104. As seen in FIG. 2, multiple electromagnets 202 may be placed in an array immediately outside of the walls 102 of a rectangular enclosure 104, adjacent to the front, back, sides, top, and/or bottom with all or most of the front remaining clear of electromagnets 202 to facilitate viewing of the artificial features 108, 110, 116. In further embodiments, electromagnets 202 may be situated below, above, and on the sides of the enclosure 104.

Figure 4:
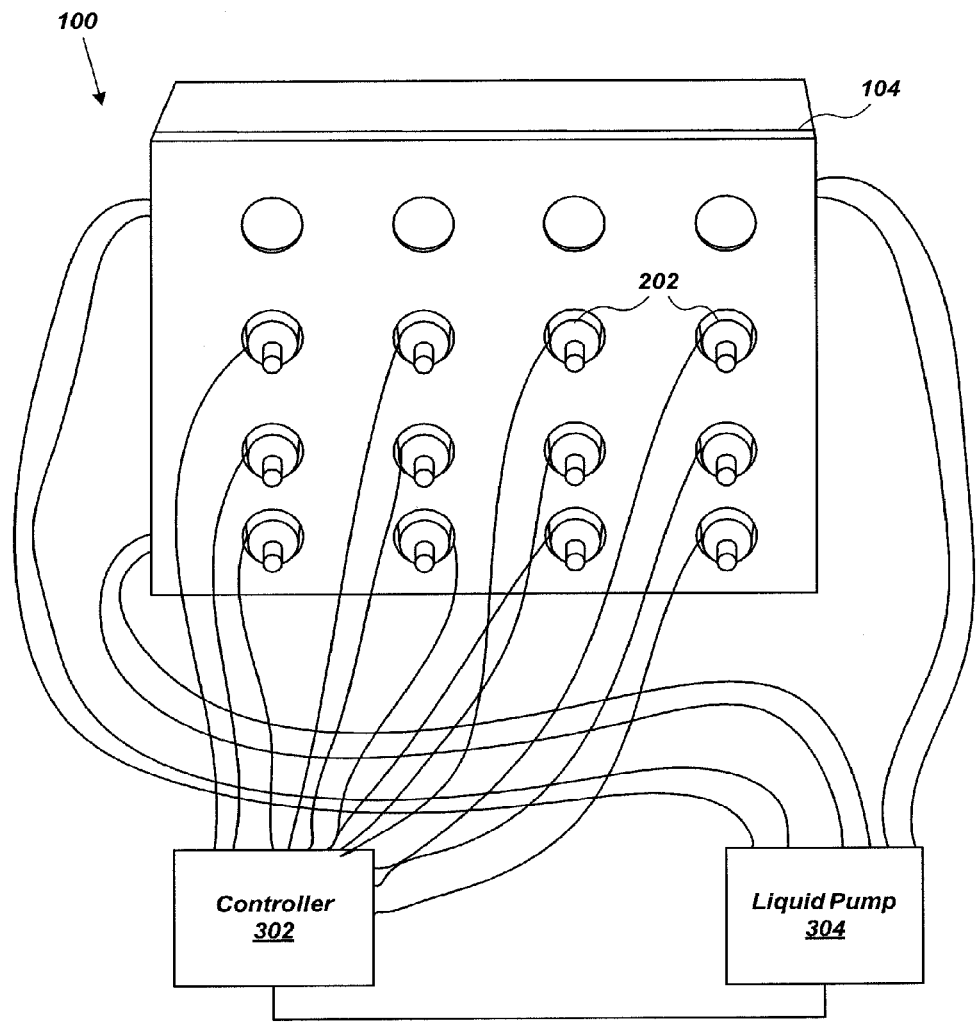
FIG. 4 is a simplified rear view of one embodiment of an apparatus for housing artificial features in accordance with the present disclosure.

FIG. 4 is a simplified rear view of one embodiment of an apparatus 100 for housing artificial features 108, 110, 116 (FIG. 1) in accordance with the present disclosure. As depicted in FIG. 4, an array of electromagnets 204 can be designed with constant spacing or designed with irregular spacing depending on the shape of the liquid enclosure 104, the desired motion of the artificial features 108, 110, 116, liquid currents, the number of electromagnets 202 that are within the design budget, and other considerations. The array of electromagnets 202 can be designed to make artificial features 108, 110, 116 move in a life-like manner with or without liquid currents caused by liquid pumps 304, 306 or other means. The array of electromagnets 202 may be designed to make the artificial features 108, 110, 116 move in a life-like manner even when the liquid enclosure 104 does have such liquid currents.

In one embodiment, the array of electromagnets 202 may be spaced to ensure coverage of the interior of the enclosure 104. The controller 302 may be connected to each electromagnet 202 and may be configured to independently operate each electromagnet 202 and to facilitate generation of magnetic fields 112 (FIGS. 1 and 2) in off, a first polarity, and a second reversed polarity. The controller 302 may also be configured to operate the liquid pump 304 in order to create a desirable current in the liquid enclosure 104. FIG. 4 depicts the controller 302 and liquid pump 304 as separated from the enclosure 104; however, it is contemplated that the controller 302, switching devices 314, liquid pump 304, air pump 308, and other control devices may be situated neatly behind, near, below, or on the enclosure 104. Panels or other devices (not shown) may be used to protect and hide the control devices.

In some embodiments, liquid currents generated by the liquid pumps 304, 306 may be used to move the artificial features 108, 110, 116. The liquid currents, in combination with the above electromagnets 202 and controller 302, provide an optional mechanism for creating both random and controlled life-like motion of the artificial features 108, 110, 116. Liquid pumps 304, 306, air pump 308, or other methods and devices may be used to create such liquid currents in combination with the reversing electromagnet(s) 202. Liquid pumps 304, 306 or air pumps 308 may be located inside or outside of the enclosure 104. A great deal of additional motion control and/or motion randomization can be obtained by controlling a liquid pump 304, 306 and/or air pump 308 from the controller 302. The liquid pumps 304, 306 or air pump 308 can be turned off and on to coordinate the movement of the liquid currents with the pulsing of the electromagnets 202. Having this complete control over liquid pump(s) 304, 306 or air pump 308 allows a programmer to have these liquid current-makers fully off, fully on, cycling on and off in a uniform time series, cycling on and off in a random time series, or cycling on and off in coordination with the electromagnets 202 pulsing on and off, including changing the magnetic polarity of the electromagnets 202.

One of the difficulties in controlling artificial fish 108 in life-like motion is that any source of constant liquid-current flow and direction may make the artificial fish 108 travel through the liquid enclosure 104 in a repetitive pattern. In one embodiment of the present disclosure, two or more liquid pumps 304, 306 may be used so that the programmer can create controlled currents, which move the artificial fish 108 more realistically. A single liquid pump 304 may similarly be combined with electrically controlled valves or gates to control where the liquid 106 enters the liquid enclosure 104. The nozzles (not shown) of the liquid pumps 304, 306 or air pump 308 may also be independently controlled or moved to add increased randomization effects as well. Furthermore, the liquid pumps 304, 306 and air pump 308 may be configured to always run and the valves situated in various locations along a single line may be electronically controlled by the controller 302 to allow jets to cause randomness and life-like movements of the artificial features 108, 110, 116, as well as the liquid currents.

The liquid pumps 304, 306 and the air pump 308 for aeration can be low voltage, by way of non-limiting example, 12 V, to eliminate the need for mains voltage except at the one or more power supplies 310, 312 (FIG. 3). This increases the safety of the apparatus 100. In embodiments where this level of safety is unnecessary, then a TRIAC ("Triode for Alternating Current") control of mains voltage may be included within or in addition to the controller 302. In accordance with some embodiments of the present disclosure, liquid flow from the liquid pumps 304, 306 and/or the air pump 308 may be unnecessary for a number of reasons as stated above and, in particular, due to the unique array of deliberately spaced electromagnets 202. The polarity reversing microcontroller 316 controlled electromagnets 202 can accomplish the movement of artificial features 108, 110, 116 throughout the enclosure 104 in realistic ways. However, embodiments that also include liquid movement may increase a programmer's design flexibility and can further enhance randomness associated with the movement of artificial features 108, 110, 116. In accordance with the present disclosure, routines may be implemented for normal behavior, clearing the corners, bottom, and top of artificial features 108, 110, 116, moving the artificial features 108, 110, 116 in only one direction (schooling), feeding behavior on command, etc. Conventional artificial fish enclosures do not include electromagnets 202 that can accomplish this without liquid flow but instead rely on liquid flow to randomly move the fish close to a sensor. The sensor then signals an electromagnet to be turned on or off without reversing a polarity of the electromagnet. Further, conventional devices lack control of the liquid or air flow via a controller 302 as described herein. One optimum artificial enclosure 104 environment embodiment is accomplished by combining control of polarity reversing electromagnets 202 and multi-directional liquid flow with a controller 302 as described herein. Furthermore, optical sensors or other sensors, which add expense and complexity, may be eliminated. However, such sensors may still be utilized in accordance with the present disclosure.

In one embodiment, light emitting diodes (LEDs) (not shown) are used to illuminate the liquid enclosure 104 in general or to provide special effects inside or outside of the liquid enclosure 104. This approach to illumination eliminates the need for mains voltages in the lighting system of the enclosure 104, and can easily be controlled by the controller 302. In such embodiments, fanciful lighting effects can be achieved, since each LED can be programmed to turn on and off to coordinate with or otherwise enhance the movement of artificial features 108, 110, 116. In fact, the reversal of an electromagnet may be coordinated with the turning on and off of LEDs, creating an illusion of the artificial features 108, 110, 116 responding to the lights, or in general having an entertaining light show. Alternatively, general liquid enclosure illumination can be done by substitution of low voltage, by way of non-limiting example, 12 V fluorescent lights to accomplish the same safety and control purposes. If this level of safety is unnecessary, and in embodiments that use fluorescent lights or other lights involving mains voltage, then a TRIAC control of mains voltage for lighting may be included within the controller 302 or in addition to the controller 302.

Figure 5:
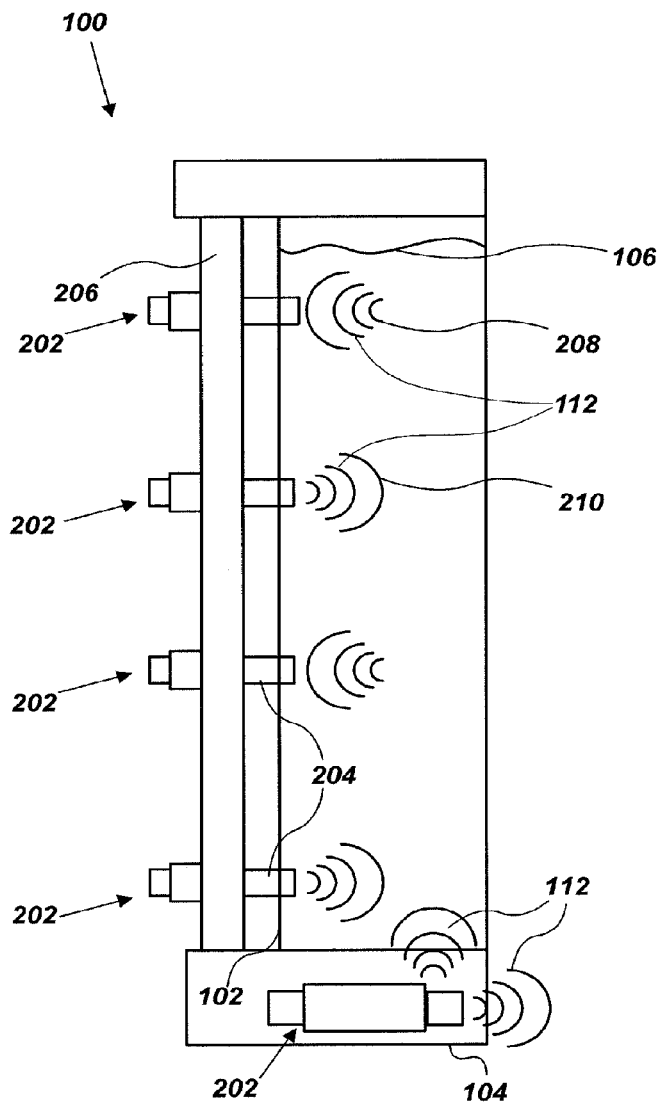
FIG. 5 is a simplified side view of a further embodiment of an apparatus for housing artificial features in accordance with the present disclosure.

FIG. 5 is a simplified side view of one embodiment of an apparatus 100 for housing artificial features 108, 110, 116, wherein respective first and second polarities 208, 210 of controlled magnetic fields 112 may be created inside an enclosure 104 by inserting only the core 204 of an electromagnet 202 into the water or other liquid 106, either from the top surface of the liquid 106 or through a sealed penetration of the liquid enclosure 104. Electromagnets 202 are made with a coil of conductor (wire) around a typically ferrous core 204. Complete electromagnets 202 of sufficient magnetic power to control the movement of artificial features 108, 110, 116 may be too bulky to decorate so that a user perceives the decoration to be, as examples only, a typical plant or relatively slender coral. Some electromagnets 202 may have cores 204 that extend substantially beyond the coil. The core 204 may extend from the coil in only one direction and still provide significant magnetic flux or force at the end away from the coil. A ferrous core 204 of a desired shape may be inserted into the enclosure 104 as depicted in FIG. 5 with only the portion of the core 204 that is outside the coil extending into the enclosure 104. The cross-sectional shape of the core 204 may vary along its length, aiding in decoration of that core 204 so as to not distract from the artificial features 108, 110, 116 of the enclosure 104. This change in cross-sectional shape may affect the magnetic fields 112 created, but a system designer can account for this effect by making changes in programming and/or use the changes in the magnetic field to advantage. The portion of the core 204 extended into the enclosure 104 can be bonded/sealed directly to an opening in the enclosure wall 102 (including the floor or ceiling) or it may be inserted into a cavity in a decoration created for that purpose. In some embodiments, a protective covering or enclosure may surround the core 204 or the entire electromagnet 202. In some embodiments, the core 204 is extended into a recess in the wall 102 and thus is surrounded by liquid but not directly exposed to the liquid.

Another aspect is to optionally use electromagnets 202 with cores 204 extended well beyond the coil of the electromagnet 202 outside the liquid enclosure 104 to shape the magnetic fields 112 that the electromagnets 202 produce. By way of non-limiting example, electromagnets 202 under the liquid enclosure 104 may include a coil with a core 204 that extends the full front to a back dimension of the enclosure 104 so that a desirable magnetic field 112 is created from the front to the back of the liquid enclosure 104 with a single electromagnet 202. This principle can be applied to any location of any electromagnet 202 in the apparatus 100. The optional aspect of this invention described in this paragraph is particularly useful in causing the fish 108 to move about the whole of a liquid enclosure 104.

Another aspect is to optionally prepare an electromagnet 202 with the core 204 relatively flush with the ends of the coil. The electromagnet 202 may be positioned outside of the liquid enclosure 104 on a liquid enclosure wall 102 (by way of non-limiting example, the bottom, side, front, or back). On the opposite side of the liquid enclosure wall 102 (inside the liquid enclosure 104) a ferrous object 702 (FIG. 7B) with no coil may be positioned, which can vary in shape, e.g., may appear as an artificial feature 108, 110, 116. The effect of this arrangement is that the magnetic field 112 created by the outside electromagnet 202 is extended and shaped by the inside ferrous object 702. One advantage is that the electromagnet 202 is not exposed to the liquid 106 in the enclosure 104, which may improve durability and possibly safety, and eliminates the need to seal penetrations in the enclosure wall 102 and/or to enclose the core 204 or electromagnet 202. Another advantage is that, optionally, an end user may move internal decorations such as artificial features 108, 110, 116 (containing a ferrous object 702) from place to place or use such accessory decorations as desired by a user. The ferrous objects 702 may then alter the appearance of the enclosure 104 and the motion of the artificial features 108, 110, 116 due to differently shaped and differently located ferrous objects 702.

An end user may also choose to remove such ferrous objects 702 if they impede the motion of the artificial features 108, 110, 116 as desired by the end user. The optional aspect described above of including a ferrous object 702 is particularly useful in "planting" artificial plants 116 on the floor of the enclosure 104, then using electromagnets 202 to cause the various stems of the artificial plant 116 to move about as though being moved by liquid surges or currents. This may enable a user to experiment with different build-ups of "coral" in a "reef" on the floor and/or sides of an enclosure 104. Then, a reversing-polarity electromagnet 202 may be used to cause fish 108 that simulate living reef fish to move about "feeding" off the "coral."

In one embodiment, some artificial features 108, 110, 116, may be moved about the interior of the enclosure 104 by the electromagnets 202 even without an internal feature magnet 602 (FIGS. 6A and 6B) housed therein. For example, instead of inserting feature magnets 602 into the artificial features 108, 110, 116, the artificial features 108, 110, 116 could have small ferrous pieces 702 inserted therein. By way of a non-limiting example, the tips of leaves of an artificial plant 116, or the tips of an elastomeric anemone (not shown) could have ferrous pieces 702 inserted therein that are reactive to a magnetic field 112.

By way of non-limiting example, several artificial fish 108 may be put into a liquid-filled enclosure 104 of approximately 20 inches long by 6 inches wide by 12 inches tall. The artificial fish 108 may have a simulated appearance of live fish including, but not limited to, juvenile emperor angelfish and may contain a permanent feature magnet 602. In one embodiment, three artificial fish 108 may have the north pole of a feature magnet 602 toward the head of each fish and three other artificial fish 108 may have the south pole toward the head of each fish. An array of eight electromagnets 202 (four columns wide by two rows high) may be placed adjacent to the back of the enclosure 104, and may be protected by an injection molded cover that covers the back and the bottom of the enclosure 104 and which houses the wires, controller 302, liquid pumps 304, 306, and air pump 308. An openable hinged hood, made, for example, by injection molding, may be attached to the back of the enclosure 104 via the hinge. The hood may contain white LEDs, which are controlled by the controller 302 as described above to light the enclosure 104. The hood may also contain LEDs of various colors, which are controlled by the controller 302 to create lighting effects. Two liquid pumps 304, 306 may be contained in the back/bottom of the enclosure 104, and the liquid pumps 304, 306 may be turned on and off by the controller 302. The liquid from each of the liquid pumps 304, 306 enters the enclosure 104 by means of a tube 114 from the liquid pumps 304, 306 that may be routed over the top of the enclosure 104 and then down into the enclosure 104. A positionable plate or nozzle may direct the liquid in a particular direction with each liquid outlet shooting liquid from a different point and in a different direction. An air pump 308 may also be controlled by the controller 302 and may be similarly located in the back/bottom of the enclosure 104. An air tube 114 may connect the air pump 308 to an air stone that runs for 4 inches at the bottom rear of the enclosure 104. All hoses, tubes, wires, coils, cores, etc., may be hidden from view and protected from tampering by the back/bottom portion of the enclosure 104, by the closed hinged hood, and/or by decorative coverings placed over or around the various devices.

The controller 302 may be programmed so that during operation of a control program, the artificial features 108, 110, 116 are repelled from one electromagnet 202 while simultaneously being attracted to another electromagnet 202 thus providing more motive force than either electromagnet 202 alone. The various electromagnets 202 are programmed in off, north pole, or south pole and coordinated with each other so that the artificial features 108, 110, 116 are either still, going one direction, going another direction, etc. The liquid pumps 304, 306 and air pump 308 may also be coordinated to be "off" or "on" to add control to the fish movements or to add a desired randomness. The liquid pumps 304, 306 and air pump 308 may also be used to make sure that no artificial feature 108, 110, 116 does the same movement over and over during a repeating electromagnetic operation by, for example, moving a starting point of an artificial fish 108 around by way of a liquid current. The movement of a liquid 106 also enhances the effects of waving fins of an artificial fish 108 and/or waving leaves of an artificial plant 116.

An artificial plant 116, such as an artificial Amazon sword plant, that contains a ferrous metal base may be "planted" on (placed next to) an electromagnet 202 that is controlled by the controller 302, in which the core 204 of the electromagnet 202 is flush with the coil. The electromagnet 202 may be situated inside the back/bottom of the enclosure 104 and adjacent to the bottom surface of the enclosure 104. The artificial plant 116 may include permanent feature magnets 602 (FIGS. 6A and 6B) in its stems, and the programming of the bottom flush-core electromagnet 202 may be operated such that the artificial plant 116 slowly waves about. The artificial plant 116 may be configured with a wire core running through the center of the "leaves." Along with a ferrous base, this connected ferrous protrusion may help transmit the magnetic field 112 up through the artificial plant 116 and cause interesting magnetically induced movement of the artificial features 108, 110, 116. The magnetic fields 112 of the electromagnets 202, which may be operated primarily for moving the artificial fish 108, add randomness to the movement of the artificial plants 116. The liquid current generated by the liquid pumps 304, 306 and air pump 308 may also facilitate movement the artificial plant 116. The controller 302 may have several programs that an end user can choose from in order to have different activity in the enclosure 104. In this example, all of the components work together for a blend of control and randomization that cause the artificial fish 108 to move all about the enclosure 104—up, down, left, right, back, forward, and cause the artificial fish 108 to swim backward and forward, and to bump into things as if eating, etc., resulting in a realistic aquatic scenario that entertains and relaxes the watcher and in general, simulates an aquarium with living fish and plants.

As an optional feature, the liquid enclosure 104 may be only partially filled, and in addition to the in-liquid movements described above, the artificial features 108, 110, 116 may be caused to move into and out of the liquid 106 by the same principles of controlled electromagnets 202. This would be particularly advantageous for simulating living creatures that live either in or out of the water, such as crabs, salamanders, or frogs. Or, it could be used for simulating creatures that do not live in water but swim in or on water, such as, for example, snakes or mice.

As another optional feature, hand-held magnets (either permanent magnets or electromagnets) (not shown) can be used to simulate creature behaviors. By way of non-limiting example, while the artificial fish 108 are going through their controlled or randomized behaviors as described above, a box simulating a box of fish food that contains a magnet may be shaken above the surface of the liquid 106 as though shaking out fish food. There may even be flakes coming out, such as flakes made of polymers or salt soluble in the liquid 106. The magnet in the box may interact with feature magnets 602 inserted into the artificial fish 108 and causes the artificial fish 108 to come to the surface "feed." Alternatively, the artificial fish 108 may be made to do tricks by a magnet or multiple magnets moved inside or outside the enclosure 104. By way of non-limiting example, a magnet on the end of a pole that is manipulated under the liquid 106 can be used to make artificial fish 108 move vigorously, even to go through hoops, obstacle courses, or into miniature soccer nets. The use of a powerful hand-held permanent magnet is advantageous (though not necessary) for this optional aspect, so one alternative is a rare earth magnet, such as a neodymium ("Nd") magnet. Powerful magnets should always be presented to users in such a way as to prevent choking or swallowing; swallowing two rare earth magnets has been known to cause intestines to be clamped off. Therefore, the molding of such magnets to, by way of non-limiting example, non-swallowable items such as the above examples of plastic poles or plastic fish-food boxes can be advantageous, though optional. Larger non-neodymium magnets, by way of non-limiting example only, Alnico or ferrous permanent magnets would also work well.

As another optional feature, the electromagnets 202 may themselves be mechanically moved during operation of the apparatus 100. In one embodiment, additional magnets (permanent or electromagnet) can be mechanically moving in conjunction with the stationary or mechanically moving electromagnets 202. Such movement and/or such combinations can cause very fast and aggressive movements among the artificial features 108, 110, 116. The mechanical movement of the electromagnets 202, in some embodiments, may also be controlled by a microcontroller 316 of the controller 302 and coordinated with the other elements of the apparatus 100, but the mechanical movement can also be controlled by other means as well, such as rotating permanent magnet systems.

As another optional feature, arrays of permanent magnets can be controlled, by way of non-limiting example only, by a servo similar to those used in remote control toys, or by a reversing electromagnet that would cause the permanent magnets, if mounted, so that they could rotate freely, to rotate back and forth to simulate the polarity reversal of an electromagnet set by the microcontroller 316.

Magnetized Artificial Features Made from Elastomeric Gel

Many artificial fish have been created for use in liquid enclosures, including fish that are made from a variety of plastics. However, in accordance with the present disclosure, the fish 108 may be manufactured using elastomeric gel including, but not limited to, plasticizer-extended triblock polymers or oil-extended triblock copolymers made by Kuraray Co., LTD. (SEPTON® brand) and KRATON® Polymers (KRATON® brand). In particular, by way of non-limiting example, SEPTON® 4044, SEPTON® 4055, and KRATON® E-1830 can advantageously be combined with mineral oil to mold fish. Gels utilizing SEPTON® 4055 are described in U.S. Pat. No. 5,994,450; gels utilizing SEPTON® 4044 are described in U.S. Pat. No. 6,797,765; gels utilizing KRATON® E1830 are described in U.S. Patent Publication No. 2006/0194925, filed Feb. 1, 2006, now U.S. Pat. No. 7,964,664, issued Jun. 21, 2011, and U.S. patent application No. 12/080,088, filed Mar. 31, 2008; the disclosures of each of these patents and patent applications are incorporated in their entirety into this application by reference. Other chemical families of elastomeric polymers can be plasticized to make elastomeric gel such as, by way of non-limiting example, urethane, PVC, and silicone polymers.

Figure 6A:
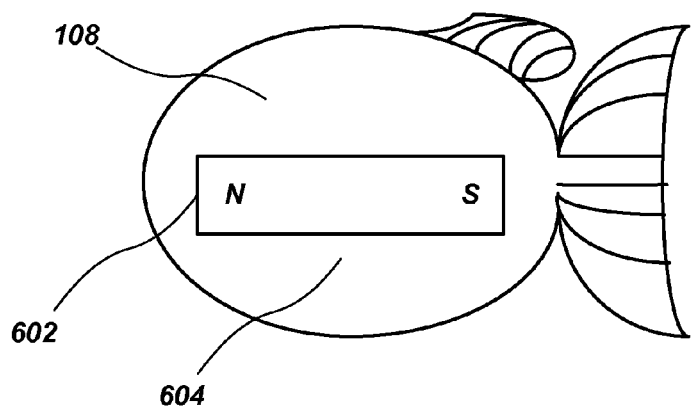
FIG. 6A is a cross-sectional view of one embodiment of an artificial feature in accordance with the present disclosure.

FIG. 6A is a cross-sectional view of one embodiment of an artificial fish 108 in accordance with the present disclosure. As depicted, the artificial fish 108 includes a body 604 that is made from an elastomeric gel as described above. A motion device, such as a permanent magnet 602, may be situated inside the body 604, wherein the motion device is reactive to a magnetic field 112 (FIG. 1). The elastomeric gel of the body 604, in combination with the motion device reacting to electromagnets 202 (FIGS. 2-5), enables the artificial fish 108 to appear and to move in a life-like manner. Although an artificial fish 108 is depicted, other artificial features 110, 116 and other design objects may be created in a similar manner.

An advantage of elastomeric gel over stiff plastic, such as polystyrene or polypropylene, is that the elastomeric gel of the artificial fish bodies 604 can be made soft and flexible enough (by adjusting the gel formulation) to flex as the artificial fish 108 is turned and controlled by a control system that moves an artificial fish 108 in a liquid 106 (FIG. 1). This is particularly true of the fins of an artificial fish 108 when fins are molded integrally with the body 604 of the artificial fish 108 from the same material. Such fins are naturally thinner than the body 604 of the artificial fish 108. Since elastomeric gels can be molded with a great level of detail, such as by injection molding (although any molding method will do), creating a realistic appearance, a comical appearance, a resemblance to a character including, but not limited to, a cartoon character, or otherwise shaping the gel fish is possible. In addition, the elastomeric gels may be water-clear, which provides the opportunity to have see-through properties, translucence, etc. The elastomeric gel can even be co-molded over a fish skeleton, for example, to imitate any of a variety of transparent fish called a "ghost fish."

The advantageous gels, listed above, are generally stronger and more durable than other gels and these gels can be decorated by airbrush, screen printing, spray masking, and other methods using a proprietary ink/paint available from EdiZONE, LLC of Alpine, Utah. In other embodiments, the gel can be co-molded with other plastics that add rigidity or are more readily paintable by widely available paints and inks, for example, PVC plastic. For instance, the head of a movie character can be molded from PVC and then co-molded with the gel body 604 of an artificial fish 108. Then, the PVC may be painted in detail with the face of the movie character. Making artificial fish 108 that are co-molded or decorated using any or all of the methods described herein and that make use of EdiZONE ink for realistic appearance, comical appearance, resemblance to a character, or other enhanced effect on the user, as desired by a product designer is contemplated herein. By reason of being stronger, the advantageous gels listed above allow the designer to make very thin, soft fins that move and wave easily as the artificial fish 108 moves from magnetic forces and/or from current, giving the artificial fish 108 improved life-like performance.

An optional aspect is to bathe the artificial fish 108 in a surfactant solution, and/or to add a surfactant solution to the liquid in the liquid enclosure to enhance the wettability of the artificial fish 108 and to provide more consistent life-like motion by reducing or eliminating bubbles of air that might otherwise change the effective buoyancy of the artificial fish 108. There are many surfactants on the market, and as an example only, one surfactant that is effective is ATMOS® 300K.

Figure 6B:
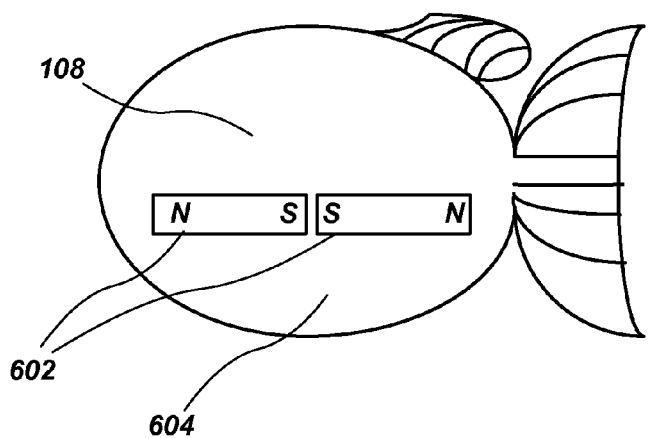
FIG. 6B is a cross-sectional view of one embodiment of an artificial feature in accordance with the present disclosure.

Depending on the gel selected, buoyancy of the artificial fish 108 may need to be adjusted to near neutral to optimize the life-likeness of the motion imparted to it. The present disclosure optionally includes that the selected gel may be foamed by chemical foaming agents, hollow microspheres (for example, glass or plastic hollow microspheres), or other means during molding, if more buoyancy is desired. Even if the gel is lighter than neutral buoyancy without these additives, it may be advantageous to increase whatever ballast weight is used to reach neutral buoyancy and use the additives to adjust the buoyancy of the gel material to be lighter. Doing this may effect how the artificial fish 108 moves in magnetic fields and/or liquid currents, and will ensure that the artificial fish 108 remains upright if the ballast is low on the body 604 (FIGS. 6A and 6B). This allows more latitude to the designer of the artificial fish 108 and therefore to the apparatus 100 and does not require a hollow body chamber to create more positive buoyancy, although a hollow chamber may be used within the scope of the invention.

Improved Internal Magnets for Use in Artificial Features

Figure 7A:
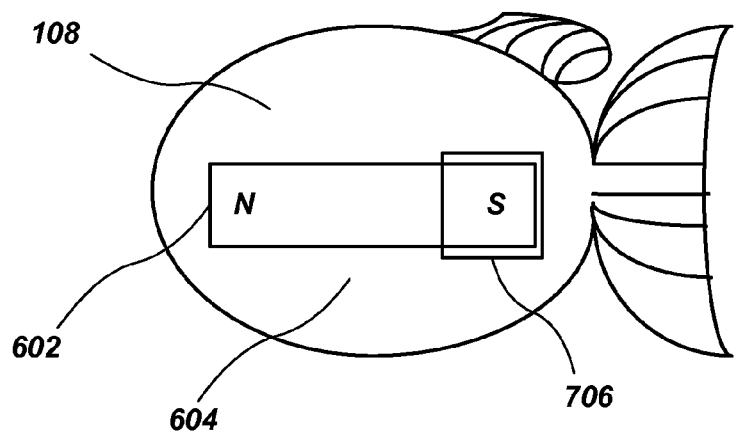
FIG. 7A is a cross-sectional view of one embodiment of an artificial feature with a shielded magnet in accordance with the present disclosure.
Figure 7B:
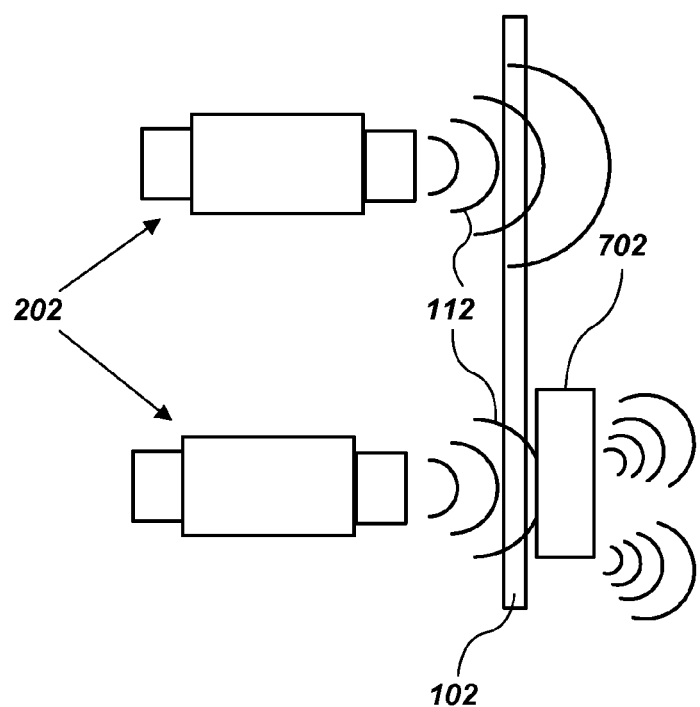
FIG. 7B is a simplified side view of an electromagnet and an electromagnet with a magnetic field shaped by a ferrous object.

In one embodiment, the present disclosure includes shielding one pole of a permanent feature magnet 602 installed inside an artificial feature 108, 110, 116 to reshape the magnetic field of the fish magnet 602 so that the control electromagnets 202 have a modified effect on the artificial feature's motion. FIG. 7A is a cross-sectional view of one embodiment of an artificial fish 108 with a shielded magnet 602 in accordance with the present disclosure. Although an artificial fish 108 is depicted, other artificial features 110, 116 are contemplated including artificial plants 116, artificial coral 110, and other design features such as those common in aquariums and aquatic environments. One cannot completely shield one pole and make a unipolar magnet, which is well understood in the art of physics of magnets. However, one can control the shape of a magnetic field so that the designer and programmer of an artificial fish 108 and apparatus 100 can more reliably control the motion of the artificial fish 108.

In many cases, depending on the material from which the artificial feature 108, 110, 116 is made, extra weight may be added to act as ballast to make the artificial feature 108, 110, 116 have neutral buoyancy and to cause the artificial feature 108, 110, 116 to float upright. Therefore, it is not a penalty to have the extra weight of a shield 706. The feature magnet shield 706 can be made from, by way of non-limiting example, steel or other ferrous materials and shaped as a cup so that some of the feature magnet 602 is in the cup of the shield 706 (shielded) and some is outside the cup of the shield 706 (unshielded). Using such partially shielded magnets may provide better programming control of the artificial features 108, 110, 116, and better control of the artificial features 108, 110, 116 can result in more life-like motion of the artificial features 108, 110, 116. This shielding of one pole may also allow the use of a stronger magnetic field generated by the feature magnet 602 directed, for example, to the front of an artificial fish 108. The shield 706 may also reshape the magnetic field toward the rear of the artificial fish 108 such that several artificial fish 108 in an enclosure 104 have less attraction for one another due to each other's feature magnets 602, when compared to unshielded magnets. This in turn, allows an artificial fish 108 to be affected farther from a given electromagnet 202, which increases the programmer's flexibility in programming the array of electromagnets 202.

A further embodiment of feature magnets 602 is to install multiple permanent feature magnets 602 into an artificial feature 108, 110, 116. In one embodiment, a plurality of permanent feature magnets 602 may be aligned within the body 604 based on a relative orientation of the north pole and the south pole of each respective feature magnet 602. By way of non-limiting example, two, three, or more permanent magnets 602 may be installed in an artificial feature 108, 110, 116 where conventional designs have used only one permanent magnet. For the non-limiting example of three permanent magnets, the poles of the permanent feature magnets 602 may be arranged (NS)(SN)(NS) or (SN)(NS)(SN) down the length of the artificial feature 108, 110, 116 depending on a desired polarity of the front magnet. FIG. 6B is a cross-sectional view of one such embodiment in accordance with the present disclosure. The result is that the artificial fish 108, or other artificial feature 110, 116 may then have an S-type undulating motion of the spine like a normally swimming fish resulting from varying magnetic fields generated by the control magnets.

In a further non-limiting example of three permanent magnets, the poles of the permanent magnets may be arranged (NS)(NS)(NS) or (SN)(SN)(SN) down the length of the artificial feature 108, 110, 116 depending on a desired polarity of the front magnet. The result is that the fish 108 may then have more reliable programmable life-like motion because the series of magnets maintain flexibility of the fish's body while moving the poles of the three-feature-magnet stack further apart so that the magnetic pole on the head end of the fish is separated more from the pole toward the tail end and may respond to the control magnets more robustly in some situations.

In one embodiment, the plurality of permanent feature magnets 602 may be situated in the body 604 substantially along a common axis such that the common axis aligns with the north pole and the south pole of each of at least two permanent feature magnets 602 (e.g., the feature magnets 602 are longitudinally aligned along the length of the body 604). In some instances, one or more permanent feature magnets 602 may be substantially offset from the common axis. For example, a first permanent feature magnet 602 may be in parallel with a second permanent feature magnet 602, but may be offset from a longitudinal axis of the second permanent feature magnet 602 (e.g., aligned above or below the longitudinal axis of the second permanent feature magnet 602). In yet a further embodiment, a plurality of permanent feature magnets 602 may be axially aligned whereas additional magnets may be offset or positioned elsewhere in the body 604.

Optionally, some of the joints between the permanent feature magnets 602 can be shielded as described above to make an artificial feature 108, 110, 116 such as an artificial fish 108 swim in a natural and much more predictable manner. In such an embodiment, if the feature magnets 602 are cylindrical, the shield 706 may be a hollow cylinder of, by way of non-limiting example, a steel cylinder that has a sufficient inside diameter to allow the fish magnets 602 to impart the desired S-type motion to the fish's body 604. If the artificial fish 108 has a soft gel body 604, then hinges may not be required as would be required in a stiff plastic fish.

The following applies to all invention groups: While the present inventions have been described and illustrated in conjunction with a number of specific embodiments, those skilled in the art will appreciate that variations and modifications may be made without departing from the principles of the inventions as herein illustrated, described, and claimed. The present inventions may be embodied in other specific forms without departing from their spirit or essential characteristics. The described embodiments are to be considered in all respects as only illustrative, and not restrictive. All changes which come within the meaning and range of equivalency of the claims are to be embraced within their scope.

What is claimed is:

1. An apparatus for housing artificial features, comprising:
   an enclosure having one or more walls and configured to house a liquid therein;
   one or more electromagnets configured to generate a magnetic field within the enclosure, wherein at least one of the one or more electromagnets is situated outside the enclosure;
   a corresponding ferrous object situated inside the enclosure, wherein the ferrous object adjusts the shape of a magnetic field generated by the at least one of the one or more electromagnets; and
   a controller configured to control one or more electric currents that generate a magnetic field from the one or more electromagnets, wherein the controller is configured to selectively reverse a direction of one of the one or more electric currents, wherein a polarity of a magnetic field of at least one of the one or more electromagnets is reversed responsive to the selectively reversed direction of the one or more electric currents.

2. The apparatus of claim 1, wherein the controller comprises a programmable portion, and wherein the programmable portion of the controller comprises a microcontroller.

3. The apparatus of claim 1, wherein the plurality of specific operating sequences causes movement of artificial features away from one or more corners of the enclosure, or toward one of the top of the enclosure, the bottom of the enclosure, and to an end of the enclosure.

4. The apparatus of claim 1, wherein the controller controls two or more electromagnets comprising a first electromagnet and a second adjacent electromagnet, wherein the first electromagnet is arranged in reverse orientation to the second adjacent electromagnet such that a polarity of a magnetic field of the first electromagnet is opposite to a polarity of a magnetic field of the second adjacent electromagnet.

5. The apparatus of claim 1, wherein the controller controls one or more H-bridge elements to start, reverse, and stop the current flow to one or more of the one or more electromagnets using a single voltage power supply.

6. The apparatus of claim 1, further comprising a first power supply and a second power supply, wherein the controller uses switching devices to supply current from one of the first power supply and the second power supply to generate a magnetic field of one of a first polarity and a second reverse polarity, respectively.

7. The apparatus of claim 6, wherein the controller is further configured to selectively provide power from the first and second power supply to the one or more electromagnets.

8. The apparatus of claim 6, wherein the controller operates a switching device that electronically connects the one or more electromagnets to one of the first and second power supplies.

9. The apparatus of claim 1, wherein the controller is configured to pulse width modulate the one or more electric currents to adjust the magnetic field generated by the one or more electromagnets.

10. The apparatus of claim 1, further comprising one or more of a liquid pump and an air pump, wherein the one or more of the liquid pump and the air pump is configured to generate a liquid current within the liquid housed in the enclosure, wherein the one or more of the liquid pump and the air pump is controlled by the controller.

11. The apparatus of claim 10, wherein the controller is configured to operate the one or more of a liquid pump and an air pump in coordination with at least one of the one or more electromagnets.

12. The apparatus of claim 10, further comprising a plurality of valves connected to at least one of the one or more of a liquid pump and an air pump, wherein each of the plurality of valves is independently operated by the controller.

13. The apparatus of claim 1, further comprising a first liquid pump and a second liquid pump, wherein the first and second liquid pumps are independently operable by the controller to alter the flow of the liquid housed in the enclosure.

14. The apparatus of claim 1, further comprising one or more light emitting diodes configured to illuminate, wherein illumination of the light emitting diodes is controlled by the controller.

15. The apparatus of claim 14, wherein the controller is further configured to operate the light emitting diodes in coordination with operation of at least one of the one or more electromagnets, a liquid pump, and an air pump.

16. The apparatus of claim 1, wherein at least one of the one or more electromagnets comprises a core having a coil configured around the core, wherein a portion of the core extends beyond the coil in an axial direction on at least one side of the coil.

17. The apparatus of claim 1, wherein at least one of the one or more electromagnets comprises a core having a coil configured around the core, wherein a portion of the core is flush with the coil in an axial direction on at least one side of the coil.

18. The apparatus of claim 1, further comprising one or more artificial features that move in response to the magnetic field generated by the one or more electromagnets.

19. The apparatus of claim 1, further comprising liquid disposed within the enclosure wherein the liquid comprises a surfactant solution.

20. An apparatus for housing artificial features, comprising:
   an enclosure having one or more walls and configured to house a liquid therein;
   one or more electromagnets configured to generate a magnetic field within the enclosure;
   a controller configured to control one or more electric currents that generate a magnetic field from the one or more electromagnets, wherein the controller is configured to selectively reverse a direction of one of the one or more electric currents, wherein a polarity of a magnetic field of at least one of the one or more electromagnets is reversed responsive to the selectively reversed direction of the one or more electric currents; and a multi-voltage power supply configured to output a first output voltage and a second output voltage, wherein the first output voltage generates a magnetic field of a first polarity in response to being connected to an electromagnet and wherein the second output voltage generates a magnetic field of a second reverse polarity in response to being connected to an electromagnet.

21. An apparatus for housing artificial features, comprising:

an enclosure having one or more walls and configured to house a liquid therein;

one or more electromagnets configured to generate a magnetic field within the enclosure, at least one of the one or more electromagnets comprising a core having a coil configured around the core, wherein a portion of the core extends beyond the coil in an axial direction on at least one side of the coil, wherein the coil and at least a portion of the core are situated outside the enclosure and wherein the portion of the core that extends beyond the coil in an axial direction extends into one of the enclosure and a recess in the enclosure; and a controller configured to control one or more electric currents that generate a magnetic field from the one or more electromagnets, wherein the controller is configured to selectively reverse a direction of one of the one or more electric currents, wherein a polarity of a magnetic field of at least one of the one or more electromagnets is reversed responsive to the selectively reversed direction of the one of the one or more electric currents.

22. An apparatus for housing artificial features, comprising:

an enclosure having one or more walls and configured to house a liquid therein;

one or more electromagnets configured to generate a magnetic field within the enclosure, wherein at least one of the one or more electromagnets is situated outside the enclosure;

a corresponding ferrous object situated inside the enclosure, wherein the ferrous object adjusts the shape of a magnetic field generated by the at least one of the one or more electromagnets; and a controller configured to control one or more electric currents that generate a magnetic field from the one or more electromagnets, wherein the controller is configured to selectively reverse a direction of one of the one or more electric currents, wherein a polarity of a magnetic field of at least one of the one or more electromagnets is reversed responsive to the selectively reversed direction of the one of the one or more electric currents, and wherein the controller is programmed to have a plurality of specific operating sequences to cause movement of one or more artificial features within the enclosure, and wherein the plurality of specific operating sequences are selectable by a user.

23. An apparatus for housing artificial features, comprising:

an enclosure having one or more walls and configured to house a liquid therein;

one or more electromagnets configured to generate a magnetic field within the enclosure, wherein at least one of the one or more electromagnets comprises a core having a coil configured around the core, wherein one end of the core is inside the limits of the coil in an axial direction on at least one side of the coil; and a controller configured to control one or more electric currents that generate a magnetic field from the one or more electromagnets, wherein the controller is configured to selectively reverse a direction of one of the one or more electric currents, wherein a polarity of a magnetic field of at least one of the one or more electromagnets is reversed responsive to the selectively reversed direction of the one of the one or more electric currents.

* * * * *